Nov. 27, 1962 W. L. BROWN 3,065,650

CANCELING CAM FOR TURN SIGNALS OR THE LIKE

Filed Oct. 5, 1960

INVENTOR.
WILLIAM L. BROWN

BY
*Learman, Learman & McCulloch*

ATTORNEYS

United States Patent Office 3,065,650
Patented Nov. 27, 1962

3,065,650
CANCELING CAM FOR TURN SIGNALS
OR THE LIKE
William L. Brown, Garden City, Mich., assignor to Boyne Products, Inc., Boyne City, Mich., a corporation of Michigan
Filed Oct. 5, 1960, Ser. No. 60,740
4 Claims. (Cl. 74—567)

This invention relates to self-canceling turn signaling devices for use with motor vehicles and more particularly to a canceling cam construction adapted for use in such turn signaling devices.

Devices of the kind in which the invention is adapted for use are semiautomatic turn signaling mechanisms wherein the signal actuating mechanism is adjusted manually by the vehicle driver to turn indicating positions and remains in such positions until the turn has been completed, whereupon the signal actuating mechanism is automatically restored to its inactive condition. The restoration of the mechanism to its inactive condition is known as canceling. Semiautomatic turn signaling devices usually include a canceling mechanism comprising one or more canceling members such as arms, levers, plates, or the like that are adapted either to engage or be engaged by a cam device which is movable relatively to the canceling member in response to rotation of a vehicle's steering wheel so as to shift the signaling mechanism from an active to an inactive position or, stated differently, to cancel the turn signal. Heretofore, the canceling structure has included cams of varying shapes and sizes. For example, it has been fairly common to manufacture the canceling cam from sheet metal stock having a cam portion formed, usually by a stamping operation, to a substantially semicircular shape, the cam portion being joined to a mounting strap that is adapted to be affixed either to the vehicle's steering shaft or to a portion of the hub of the steering wheel. Other cam constructions have consisted merely of pins or lugs fixed in the hub of a steering wheel or the like, while still other forms of canceling cams have been formed integrally with other parts of the steering apparatus.

All of the foregoing kinds of cam constructions have certain disadvantages. For example, a stamped cam is difficult to form on a true diameter because of the inherent difficulty in stamping small articles and because of the wear on the stamping tools or dies. If a stamped cam is not formed on a true diameter or radius, then it is possible for a canceling member to ride or slide over the canceling member without exerting sufficient thrust on the latter to effect canceling of the turn signal. With pins or posts secured to hubs or the like, a separate assembling operation is required and, in addition, it is difficult to assure true parallelism of such pins or posts with the axis of the rotatable part on which they are mounted. Thus, the posts or pins are subject to the same criticism mentioned with respect to overriding of the stamped cam by the canceling member.

With both stamped cam and post or pin cam devices, considerable care must be exercised in orienting the canceling mechanism with the cam structure. Unless such care is exercised, the cam devices could be so located relatively to the canceling mechanism as to be incapable of operating the latter. In many vehicle constructions there is very little space available to a workman in installing or replacing the parts of the turn signaling device, so the necessity of exercising considerable care is compounded by the difficulty in arranging the parts. The foregoing observations also apply with equal force to those constructions wherein the cam devices are formed as integral parts of the steering mechanism.

An object of this invention is to provide a canceling cam construction for turn signal devices that overcomes the disadvantages of prior cam devices.

Another object of the invention is to provide a canceling cam construction that is so shaped as inherently to prevent the canceling member from riding over the cam without actuating the canceling mechanism.

Another object of the invention is to provide a canceling cam which inherently maintains a true diameter with the rotatable steering mechanism on which it is adapted to be mounted.

A further object of the invention is to provide a canceling cam construction which does not require any great degree of accuracy or care during its assembly with other parts of the canceling mechanism.

Still another object of the invention is to provide a canceling cam construction which is much simpler to manufacture than previously known cams and yet which still costs less than known cams.

Other objects and advantages of the invention will be pointed out specifically or will become apparent from the following description when it is considered in conjunction with the appended claims and the accompanying drawing, in which:

Figure 1:
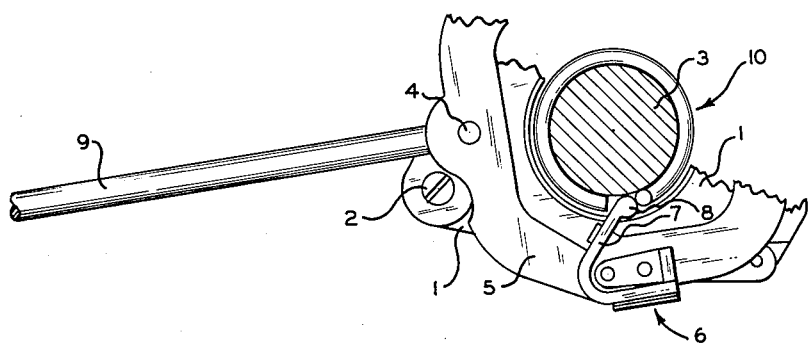
FIGURE 1 is a fragmentary, partly sectional plan view of a turn signal mechanism equipped with a canceling cam constructed in accordance with the invention.
Figure 5:
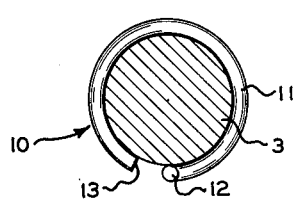
FIGURE 5 is a transverse sectional view of the assembly shown in FIGURE 4.
Figure 2:
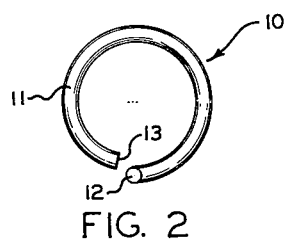
FIGURE 2 is a plan view of the canceling cam shown in FIGURE 1.
Figure 4:
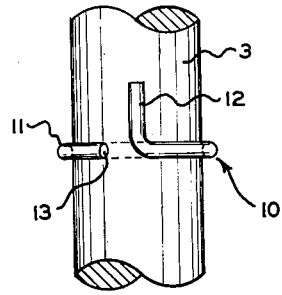
FIGURE 4 is a fragmentary, elevational view of a steering shaft or the like fitted with a cam constructed according to the invention.
Figure 3:
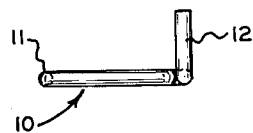
FIGURE 3 is a side view of the cam.

A typical turn signal mechanism is partially disclosed in FIGURE 1 as comprising a base or support structure 1 adapted to be mounted on a vehicle steering column (not shown) by means of screws, one of which is shown at 2 and through which a rotatable, cylindrical steering shaft 3 extends. Pivotally mounted on the support 1 by means of a pivot pin 4 is a ring 5 at opposite sides of which is mounted a pair of canceling devices 6, only one of which is shown in the drawing. Each canceling device is the same and includes an arm 7 which preferably has an enlarged and rounded head 8 at its free end.

During inactive periods of the turn signal mechanism the ring 5 normally is maintained in a neutral position, but when a turn is to be made a lever 9 connected to the ring 5 may be actuated so as to move one or the other of the canceling devices 6 in such direction as to cause its finger 7 to move toward the steering shaft 3. The parts of the apparatus thus far described are in the positions they occupy when set to indicate a left-hand turn.

Means (not shown) is provided for releasably maintaining the ring 5 and its associated mechanism in signal actuating position until such time as rotation of the steering shaft 3 in a direction opposite the direction in which the turn was made effects restoration of the ring and its associated mechanism to their neutral positions by engagement of the appropriate canceling arm 7 by a cam 10 formed in accordance with the invention.

The turn signal mechanism is only fragmentarily disclosed and briefly described, but it may be of the kind disclosed in Patent No. 2,902,556, granted September 1, 1959.

The cam 10 is preferably formed from a single length of circular cross section, tempered spring steel having a ring-like mounting portion or loop 11 terminating at one end in a right angularly bent finger element 12 of substantial length. The mounting portion 11 is not formed as a true circle but, instead, is spirally formed on a decreasing radius from the juncture of the finger 12 with the mounting portion 11 so that the terminal end 13 of the mounting portion 11 is located inwardly of the finger 12. In other words, the whole of the finger 12 and the end of the portion 11 of which it is joined lie in the same plane. The degree of spiralling of the mounting portion 11 should be such that the diametral distance from the terminal end 13 to the opposite side of the portion 11 is less than the diameter of the steering shaft 3. Due to the spiralling construction of the mounting portion 11 of the cam, its assembly with the steering shaft 3 will cause the terminal end portion to be stressed outwardly and this stress will be transmitted all along the mounting portion 11 so as to assure a firm, frictional engagement between the mounting portion 11 and the steering shaft 3 substantially throughout the length of the mounting portion.

When the cam 10 is assembled on the shaft 3, the full length of the finger 12 will lie against the periphery of the shaft with its longitudinal axis parallel to the axis of the shaft 3. Such an arrangement is assured by the coplanar relationship of the finger 12 and the adjacent end of the loop 11. The finger 12 therefore always will be at a uniform distance from the axis of rotation of the steering shaft. Since the finger is in engagement over its full length with the shaft 3, it is protected against being bent.

The cross sectional area of the member forming the canceling cam may vary according to standard wire sizes, the only criterion of size being that a substantial portion of the surface area of the finger be presented to the canceling arm 7 during rotation of the shaft 3 when the turn signal mechanism is in one of its activated positions. Proper dimensioning of the parts may be achieved if only a small clearance exists between the finger 12 and the heads 8 of the canceling arms when the apparatus is in its inactive position.

Inasmuch as the finger portion 12 of the cam is circular in cross section, it will present to the canceling finger 7 an arcuate surface of more than 180°. Consequently, engagement of the finger 12 with the arm 7, as is shown in FIGURE 1, will assure there being sufficient surface area of the finger in engagement with the arm 7 as to assure operation of the canceling mechanism.

The cam 10 preferably is formed from lengths of standard spring wire. Consequently, the cam can be formed with a canceling finger having any desired length. The importance of this characteristic of the invention is that it permits the cam to be operatively associated with the canceling devices 6 without making it necessary for the mounting portion 11 to be mounted precisely relatively to the canceling arms 7. It is only necessary that the mounting ring 11 be out of the zone occupied by the arms 7 and that the finger 12 be so located as to be capable of engaging the arms when either of them is adjusted into its active position.

By using lengths of standard spring wire to form canceling cams according to the invention, substantial savings in material and labor can be effected over the manufacture of canceling cams of the kind referred to earlier herein, not only by the elimination of stamping dies but also by reducing the number of operations necessary to form a cam.

The disclosed embodiment is representative of a presently preferred form of the invention but is intended to be illustrative rather than definitive thereof. The invention is defined in the claims.

I claim:

1. A canceling cam for use in a turn signal device having a canceling member movable toward and away from a rotatable steering member, said canceling cam comprising an elongated finger portion providing a cam surface of substantially circular cross section, said finger portion terminating at one end in a spiraling mounting loop of varying diameter and lying in a plane substantially normal to the longitudinal axis of said finger portion for mounting said finger portion on said steering member for rotation therewith and adjacent said canceling member, said finger portion being of such cross sectional size as to be capable of engaging said canceling member when the latter has been moved toward said steering member, and moving said canceling member away from said steering member.

2. The construction set forth in claim 1 wherein said finger portion and said mounting loop are integral.

3. The construction set forth in claim 1 wherein said steering member is substantially cylindrical and wherein said spiraling mounting loop has a diametral dimension different from the corresponding dimension of said steering member.

4. The construction set forth in claim 3 wherein said mounting loop spirals inwardly from its juncture with said finger portion.

References Cited in the file of this patent

UNITED STATES PATENTS

| | | |
|---|---|---|
| 786,294 | Joy | Apr. 4, 1905 |
| 2,091,391 | Hale | Aug. 31, 1937 |
| 2,569,096 | Geiger et al. | Sept. 25, 1951 |
| 2,902,556 | Dryer | Sept. 1, 1959 |
| 2,999,911 | Dryer et al. | Sept. 12, 1961 |

FOREIGN PATENTS

| | | |
|---|---|---|
| 1,080,297 | France | May 26, 1954 |